Sept. 19, 1944.   H. R. SHERWOOD   2,358,352
INDICATOR
Filed Feb. 13, 1943
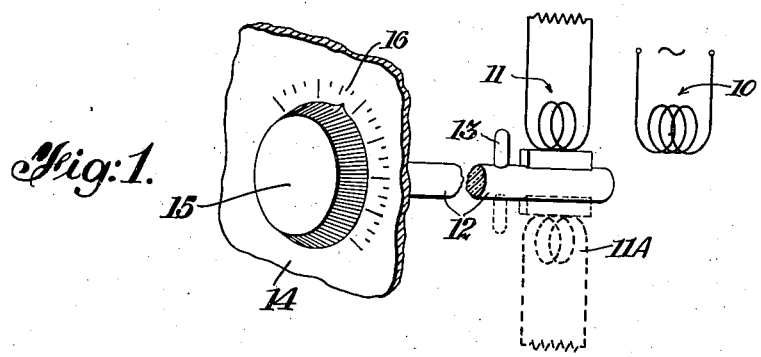
*Fig: 1.*
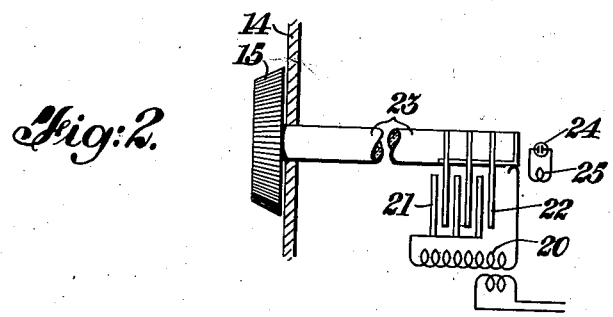
*Fig: 2.*
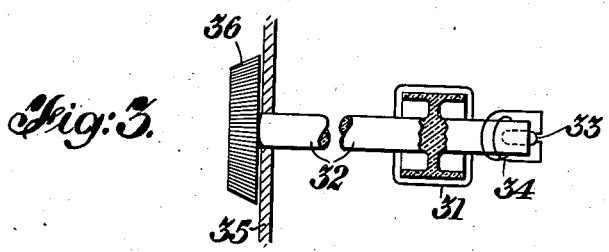
*Fig: 3.*
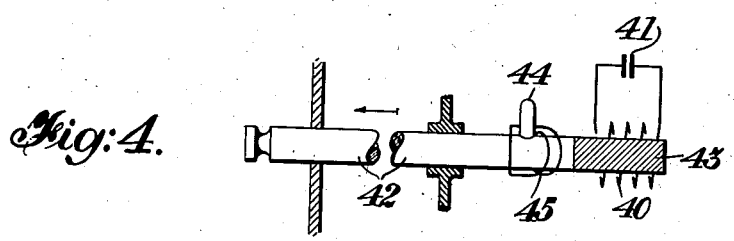
*Fig: 4.*
INVENTOR.
HARRY ROY SHERWOOD
BY
*R P Morris*
ATTORNEY

Patented Sept. 19, 1944

2,358,352

UNITED STATES PATENT OFFICE 2,358,352

INDICATOR

Harry Roy Sherwood, Jackson Heights, N. Y., assignor to Federal Telephone and Radio Corporation, Newark, N. J., a corporation of Delaware Application February 13, 1943, Serial No. 475,804

7 Claims. (Cl. 250—40)

This invention relates to indicators and more particularly to indicators adapted to show the energy transfer condition of a circuit at a remote viewing point.

It is often desirable to indicate at a remote viewing point the tuning condition or coupling condition of a circuit. This is commonly accomplished by use of meters located at the viewing point and coupled to the circuit. Such systems, however, in the hands of non-technical operating personnel may lead to confusion and maladjustment of the circuit. Furthermore, meters are delicate and expensive instruments and add to the bulk of a system.

It is an object of my invention to provide a simple indicating circuit free of the faults found in the use of meters.

It is a further object of my invention to provide a simple indicating arrangement which will serve to indicate at a remote point the condition of a tuning circuit without requiring the space normally used for meters.

In accordance with my invention, I provide a control shaft of some light conducting material such as that known under the name of "Lucite" or some forms of polystyrene. Such thermoplastics will conduct light very efficiently even from a very weak source. This shaft is used for adjusting a tuning element or a coupling coil at a remote circuit. At this remote point in the field of the circuit is provided a small lamp bulb adapted to be lit by energy from the circuit when this energy reaches a predetermined level. This lamp is placed in light transfer relation with respect to the shaft so that light therefrom may be noted at the remote point.

A better understanding of my invention and the objects thereof may be had by reference to the accompanying drawing, in which:

Fig. 1 is a diagrammatic view illustrating application of my invention to a coupling circuit;

Fig. 2 is a diagrammatic view illustrating application of my invention to a tuned resonant circuit;

Fig. 3 is a diagrammatic view showing an alternative rotatable coupling coil arrangement; and Fig. 4 is a diagrammatic view showing a still further coil tuning arrangement.

Turning first to Fig. 1, 11 indicates a rotatable coil mounted on a light conducting shaft 12 and variably coupled with fixed coil 10. Fitted into a depression in shaft 12 is the end of a small light 13 which may be a tungsten filament bulb of the "grain of wheat" type or a small gas filled tube. Shaft 12 extends from a point adjacent the circuit 10, 11 to a remote point on an indicator panel 14. An adjusting knob 15 preferably composed of some suitable translucent material is provided to rotate the shaft to a desired position and an indicating dial 16 is provided to indicate the rotary position of shaft 12 and coil 11. As shaft 12 is rotated, coil 11 may be moved from the coupling position shown in solid lines to the uncoupled position of the dotted lines at 11A. It will be understood that as coil 11 is brought into coupling relation with coil 10 a greater amount of energy will be transferred into coil 11. Since lamp 13 is in the field of coil 11, energy from this coil will serve to light lamp 13 when the energy reaches a predetermined level.

In the arrangement of Fig. 2 is shown a system which may be utilized for adjusting tuning of a resonant circuit such as a transmitter tank circuit. This circuit comprises a coil 20 and a variable condenser having stator plates 21 and rotor plates 22 mounted on a rotatable shaft 23 of light conducting material. Adjacent one end of the shaft is provided a small lamp 24 to which may be coupled a coil 25 which serves to receive energy from the resonant circuit. At the other end of the shaft in panel 14 is provided an adjusting knob 15 which serves to adjust the rotary position of rotor plates 22 of the condenser. As the circuit 20, 21, 22 is adjusted to resonance by rotation of shaft 23, the energy in the circuit will greatly increase causing sufficient energy to be transferred to lamp 24 over coil 25 to light the lamp. Light from the lamp will be conducted through shaft 23 to the remote indicating point adjacent knob 15. It should be clearly understood that lamp 24 may be of either the filament type or the gaseous type and if desired may be mounted in shaft 23, as was shown in connection with Fig. 1. Furthermore, if the energy level is sufficiently high coil 25 may be omitted.

In Fig. 3 is shown a modification wherein a rotatable coil 31 similar to coil 11 of Fig. 1 is mounted on a light conducting shaft 32. A small lamp 33 is mounted in one end of the shaft and a small coil 34 is wound on the end of the shaft in coupling relation with coil 31 and connected to lamp 33 in order to cause illumination thereof. The other end of shaft 32 passes through a control panel 35 and is adjusted in rotary position by control knob 36.

In Fig. 4 is shown a modified circuit comprising a coil 40 and a fixed condenser 41. A slidable shaft 42 has mounted on one end thereof a metallic portion 43 adapted to be moved longitudinally with respect to coil 40. This may be the known form of copper slug tuning, used to adjust circuit 40, 41 to resonance. A lamp 44 is mounted in shaft 42 and provided with a coupling coil 45 connected to the lamp and in coupling relation with coil 40. Upon the moving of element 43 to the proper position within coil 40 to tune the circuit to resonance, lamp 44 will be lit and the light therefrom transferred to a remote indicating point at the far end of shaft 42.

Many alternative structures wherein a light conducting shaft is used for the combined purpose of adjusting a tuning or coupling element or the like and for conducting indication of the condition thereof may be made by those skilled in the art without departing from the spirit of my invention as set forth in the objects thereof and in the accompanying claims.

What is claimed is:

1. An indicator for indicating the presence of electrical energy above a predetermined level in a circuit having a movable element to alter the energy transfer characteristics of said circuit, comprising a movable shaft of light transmitting material, for adjusting said movable element, extending from a point adjacent said circuit to a viewing point, and a lamp in the field of said circuit adapted to be lit by receipt of energy above said predetermined level from said circuit and positioned in light transferring relation with respect to said shaft, whereby upon adjustment of said movable element to a position providing a given energy transfer to said lamp an indication will be produced at said viewing point.

2. An indicator according to claim 1 wherein said circuit is a tunable resonant circuit and said movable element comprises means for adjusting the tuning of said circuit.

3. An indicator according to claim 1 wherein said circuit is a variable coupling circuit and said movable element comprises a rotatable variable coupling coil.

4. An indicator according to claim 1 further comprising energy pick-up means coupled with said lamp.

5. A resonance indicator for indicating the resonant condition of a circuit at a relatively remote point comprising a tunable circuit, movable means for tuning said circuit, an indicating lamp in the field of said circuit adapted to be lit by energy transferred to it when said circuit is tuned to resonance, and a shaft of light transmitting material for moving said movable means, and having one end positioned adjacent said indicating lamp and the other at said remote point.

6. An indicator according to claim 5 wherein said movable means comprises a rotary reactance element mounted on said shaft.

7. An indicator according to claim 5 wherein said circuit includes an induction coil and said movable means comprises a metallic element mounted on said shaft and movable longitudinally within said coil.

HARRY ROY SHERWOOD.